(12) United States Patent
Norfleet et al.

(10) Patent No.: US 6,355,600 B1
(45) Date of Patent: Mar. 12, 2002

(54) SHALE STABILIZING DRILLING FLUIDS COMPRISING CALCIUM CHLORIDE AND LOW MOLECULAR WEIGHT LOW CHARGE CATIONICPOLYACRYLAMIDE COPOLYMERS

(75) Inventors: James E. Norfleet; Michael A. Jarrett; Patricia A. Potts; Tao Xiang, all of Houston; Frank E. Evans, Jr., The Woodlands, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/411,346

(22) Filed: Oct. 1, 1999

Related U.S. Application Data

(60) Provisional application No. 60/102,729, filed on Oct. 1, 1998.

(51) Int. Cl.$^7$ .................................................. C09K 7/02
(52) U.S. Cl. ...................................... 507/120; 507/145
(58) Field of Search ................................ 507/120, 145, 507/225

(56) References Cited

U.S. PATENT DOCUMENTS

| | | | |
|---|---|---|---|
| 3,210,310 A | 10/1965 | Holbert et al. | |
| 3,562,226 A * | 2/1971 | Gayley | 507/120 |
| 4,425,241 A | 1/1984 | Swanson | |
| 4,540,496 A * | 9/1985 | Peiffer | 507/120 |
| 4,552,670 A * | 11/1985 | Lipowski et al. | 507/120 |
| 4,554,081 A | 11/1985 | Borchardt et al. | |
| 4,600,515 A | 7/1986 | Gleason et al. | |
| 4,626,363 A * | 12/1986 | Gleason | 507/120 |
| 4,649,183 A | 3/1987 | McCormick et al. | |
| 4,861,499 A | 8/1989 | Neff et al. | |
| 4,892,916 A | 1/1990 | Hawe et al. | 526/304 |
| 5,607,902 A * | 3/1997 | Smith et al. | 507/120 |
| 5,735,349 A * | 4/1998 | Dawson et al. | 507/225 |
| 5,762,141 A * | 6/1998 | Hutchins et al. | 507/225 |

FOREIGN PATENT DOCUMENTS

| | | |
|---|---|---|
| EP | 0 544 377 A1 | 6/1993 |
| EP | 0 72/8 826 A1 | 8/1996 |

* cited by examiner

*Primary Examiner*—Philip Tucker
(74) *Attorney, Agent, or Firm*—Paula D. Morris & Associates, P.C.

(57) ABSTRACT

A drilling fluid and method of using same. The drilling fluid comprises water as a continuous phase, an amount of calcium chloride, and a quantity of a polyacrylamide copolymer. The amount of calcium chloride and the quantity of polyacrylamide copolymer in the drilling fluid are sufficient to produce a rate of penetration approaching that achieved using a synthetic oil-based drilling fluid while preventing substantial screen blinding. In a preferred embodiment, the continuous phase also comprises a second amount of a monovalent salt effective to increase gas hydrate suppression and decrease density when compared to a fluid consisting essentially of only a divalent salt in the absence of the monovalent salt.

121 Claims, No Drawings

SHALE STABILIZING DRILLING FLUIDS COMPRISING CALCIUM CHLORIDE AND LOW MOLECULAR WEIGHT LOW CHARGE CATIONICPOLYACRYLAMIDE COPOLYMERS

This application claims priority from provisional application No. 60/102,729 filed Oct. 1, 1998.

FIELD OF THE INVENTION

The present invention relates to drilling, drill-in, and completion fluids, preferably water-base fluids, with good shale encapsulation properties resulting from the presence of calcium chloride and a low molecular weight, low charge cationic polyacrylamide copolymer.

BACKGROUND OF THE INVENTION

Fluids used during drilling operations include "drilling," "drill-in," and "completion" fluids. A "drill-in" fluid is pumped through the drill pipe while drilling through the "payzone," or the zone believed to hold recoverable oil or gas. A "drilling fluid" is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole. A "completion fluid" is used to protect the "payzone" during the completion phase of the well.

Fluids in which water is the continuous phase provide for a fast drilling rate, and are ecologically favored over fluids in which oil is the continuous phase. Unfortunately, the walls of a wellbore frequently are composed at least in part of shale, and when exposed to water, many shales swell, slough, or spall to the extent that they may even prevent further operation of the wellbore. Shale also may slough off during gravel transport in open-hole completion, mix with the gravel, and reduce the productivity of the well by choking off the permeability of the gravel pack. The sloughing also may cause screen blinding.

Brines have long been used in the formulation of drilling fluids to take advantage of their density and their inhibitive characteristics. Clay chemistry has shown us that cationic base exchange with the negatively charged clay minerals commonly found in shale formations, limits their ability to hydrate, soften, and swell, thereby rendering them more stable in the presence of water based fluids.

Monovalent salts, such as NaCl or KCl, have long been used as make up water for drilling fluids. In the past, NaCl or KCl have provided a limited inhibitive environment for drilling hydratable shales in many areas. In offshore drilling, seawater—a complex mixture of various salts which is readily available—has frequently been used in formulating drilling mud.

Today, technological advances in the design of drilling equipment has resulted in increased penetration rates for better drilling economics. The performance of the monovalent salt systems has not been able to maintain pace with new advances in drilling technology. The need for improved drilling mud systems saw the application of oil mud systems and development of synthetic systems to meet these challenges. However, increasing environmental regulation has limited the application of these systems.

Divalent salts are known to provide an added inhibitive benefit for drilling water sensitive shales. Divalent salts are capable of developing a strong bond with and between active clay platelets in these shales, thereby further limiting the volume of hydration water that can become a part of the clay, causing it to become soft, pliable, and sticky, resulting in problems with mechanical drilling equipment and drilling fluid control. One of the most available and economical divalent salt systems is $CaCl_2$. $CaCl_2$ systems have been around for many years, and the inhibitive characteristics of the calcium ion are well known.

Water-soluble polymers are used to thicken water-base fluids, and in part to synergistically stabilize shale. The water-soluble polymers provide the viscosity necessary to lift drilled solids from the wellbore, and tend to improve drilling rates.

Unfortunately, fluids which have shown promise in increasing the rate of penetration through shales also have tended to increase screen blinding, which can lead to huge losses of mud, with loss of rig time and high fluid costs. Water base fluids are needed which can achieve a high rate of penetration without screen blinding.

SUMMARY OF THE INVENTION

The present invention provides a drilling system fluid comprising water as a continuous phase, a first amount of a divalent metal salt, and a quantity of a polyacrylamide copolymer, wherein the amount of the divalent salt and the quantity of polyacrylamide copolymer are sufficient to produce a rate of penetration approaching that achieved using a synthetic oil-based drilling system fluid while preventing substantial screen blinding. In a preferred embodiment, the continuous phase also comprises a second amount of a monovalent salt effective to increase gas hydrate suppression and decrease density when compared to a fluid consisting essentially of only a divalent salt in the absence of the monovalent salt.

DETAILED DESCRIPTION OF THE INVENTION

The present invention involves formulating aqueous-base drilling fluids to stabilize shale encountered during drilling. The water base fluids of the present invention comprise a combination of a suitable divalent salt, a suitable monovalent salt and a relatively low charge cationic, low molecular weight polyacrylamide copolymer. In a preferred embodiment, the divalent salt is calcium chloride and the monovalent salt is sodium chloride. This fluid composition provides a rate of penetration that approaches synthetic oil-based systems, and also provides good shale encapsulating properties for control of gumbo shale without substantial screen blinding. For purposes of the present application, the term "substantial screen blinding" is defined as the formation of a mat of undissolved or dispersed polymer on the shaker screen, which blocks passage of the hole fluid through the shaker screen, causing the hole fluid to overflow the shaker screen.

The polyacrylamide copolymers of the present invention may be used in substantially any drilling, drill-in, or completion fluid. As used herein, the term "drilling fluid" or "drilling fluids" shall be interpreted to refer to any one of these kinds of fluids. Preferred drilling fluids have water as a continuous phase.

Preferred drilling fluids comprise a mixture of salts consisting of brines comprising about 5 wt % to about 20 wt %, preferably about 15 wt % of the divalent salt, most preferably calcium chloride and about 0 lb/bbl to about 70 lb/bbl, preferably about 40 lb/bbl to about 70 lb/bbl, most preferably 50 lb/bbl of the monovalent salt, preferably sodium chloride. The fluids can contain substantially any suitable salts, suitable divalent salts include, but are not necessarily limited to salts based on metals, such as calcium, magnesium, zinc, and aluminum. Suitable monovalent salts include but are not necessarily limited to those based on metals such as sodium, potassium, cesium, and lithium. The salt may contain substantially any anions, with preferred anions including, but not necessarily limited to chlorides, bromides, formates, propionates, sulfates, acetates, carbonates, and nitrates. A preferred anion is chlorine. Preferred brines comprise calcium chloride. Sodium chloride is typically added to the drilling fluid after the calcium chloride brine.

The water-base drilling fluids contain "water-soluble polymers," defined as polymers that are capable of viscosifying a drilling fluid and/or providing filtration control for a drilling fluid. Preferred viscosifiers and filtration control agents are XAN-PLEX™ D, BIO-PAQ™ and/or BIOLOSE™, all of which are commercially available from Baker Hughes INTEQ.

The drilling fluids of the present invention also contain "polyacrylamide copolymers" to provide shale inhibition. The term "polyacrylamide copolymers" is defined herein to refer to cationic polyacrylamide copolymers having a relatively low molecular weight and a relatively low charge. The term "low molecular weight" is defined to mean copolymer units having from about 500,000 to 4 million mole weight, preferably from about 800,000 to about 1 million mole weight. The term "low charge" is defined to mean from about 1 mol % to about 15 mol % of a cationic monomer charge, preferably about 5 mol % to about 10 mol % cationic monomer charge. The cationic monomer charge may be from about 1 to about 4. Without limiting the present invention to a particular mechanism of action, it is believed that cations in the polyacrylamide copolymer adsorb onto the negatively charged surface of the shale, forming a gelatinous protective layer which inhibits degradation of the shale.

Suitable polyacrylamide copolymers have the following general structure:

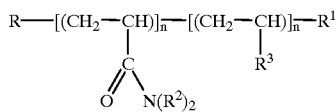

wherein R and $R^1$ are selected from the group consisting of hydrogen, acrylamide groups, acrylate groups, polyacrylamide groups, and polyacrylate groups, and copolymers thereof; $R^2$ is selected from the group consisting individually of hydrogen, and alkyl groups, preferably methyl and ethyl groups; and, $R^3$ is selected from the group consisting of ester groups comprising a cationic group and amide groups comprising at least one cationic group, wherein said cationic group comprises a charge in the range of from about +1 to about +4; and, n is at least 1. A preferred cationic group has the following general structure:

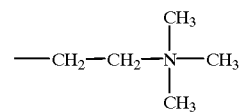

Suitable polyacrylamide copolymers are commercially available from a number of sources, and include but are not necessarily limited to HYPERDRILL CP-904L™, available from Hychem, Inc., Tampa, Fla., and SUPERFLOC™, available from Cytec Industries, West Patterson, N.J. A preferred polyacrylamide copolymer is DFE-243, which comprises partially hydrolyzed polyacrylamide (PHPA) and trimethylaminoethyl acrylate, which has about a 800,000 to 1 million molecular weight and about a 5% to about a 10% cationic charge density. DFE-243 is commercially available from Baker Hughes INTEQ.

In order to achieve the desired shale stabilization, the fluid should contain from about 0.05 wt % to about 0.5 wt % of the polyacrylamide copolymer, preferably at least about 0.08 wt %, most preferably at least about 0.3 wt %,of the polyacrylamide copolymer.

Bridging or weighting agents preferably should be added to bridge the pores in the formation. Suitable bridging or weighting agents include, but are not necessarily limited to ground marble or calcium carbonate particles, such as MIL-CARB, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, then from about 10 to about 50 pounds should be used per barrel of brine.

Preferred polyacrylamide copolymer containing drilling fluids are "non-toxic." As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. The mysid shrimp toxicity test for a drilling fluid according to the present invention containing 1.0–1.25 lb/bbl DICAP™ resulted in an $LC_{50}$ of 120,000 ppm of the suspended particulate phase (SPP)—4 times the minimum EPA standard for discharge into coastal waters. The toxicity tests for the 0.1–1.5 lb/bbl DFE-243 resulted in an $LC_{50}$ of 150,000–300,000 ppm of the SPP.

In order to prepare the foregoing drilling fluids, fresh water is placed in a mixing hopper and the following are added: the viscosifying polymer (XAN-PLEX™ D, available from Baker Hughes, INTEQ), and the filtration control polymer (BIO-PAQ™ and/or BIOLOSE™, also available from Baker Hughes INTEQ). The mixture is agitated well before adding the calcium chloride brine and the sodium chloride. XAN-PLEX™ D and the polyacrylamide copolymer should not be added at the same time. A preferred mixer to prevent "fish-eyeing" of the polymers is a shear device similar to Gauthier's Brothers, POLYGATOR GBR. The mixing equipment should be capable of very good agitation at high shear to disperse all of the ingredients—particularly the polymeric ingredients—to achieve a final smooth blend. Preferably, the mixing hopper should be in-line so the sheared polymer goes directly into the mixing tank as opposed to using a low shear hopper and then "re-circulating" through the high shear device. The mixing pits also should have an impeller for proper mixing and dispersion of the polymers.

Preferably, calcium chloride or a 15 wt % calcium chloride brine is added to the mixture first, then NaCl is added to the mixture. After sufficient agitation, the polyacrylamide copolymer is sifted into the mixture with good agitation. After sufficient agitation, MIL-CARB™, MIL-BAR™, and any other additives, such as gas hydrate suppressors, are added to the mixture with agitation, as needed. To minimize sag of MIL-CARB™ and MIL-BAR™ during storage or transport, 3 lb/bbl of SALT WATER GEL® may be added and sheared well before transferring the fluid to the mixing pit. Before measuring the pH of the mud, the mud should be diluted in a ratio of 9 parts deionized water to 1 part mud and thoroughly mixed.

If cement is to be drilled using the fluid of the invention, the fluid should be protected from cement contamination. In order to prevent cement contamination, the acidic pretreatment product is added before any green cement (MIL-CARB™ or MIL-BAR™) is incorporated into the system to prevent pH effects on the biopolymer or filtration control agent. Citric acid powder (to reduce pH to ±7) is recommended as a pretreatment product and can be used more safely than commonly used liquid acetic acid to control mud pH while drilling cement.

As much "quality" premix mud should be prepared at the mixing plant as possible so that the mud engineers on the rig can keep up with mud volume requirements of large diameter/high rate of penetration drilling operations. Otherwise, the polymers may be poorly dispersed, resulting in severe "fish-eyeing" and resultant screening problems.

The invention also is directed to a method for increasing shale stability of a drilling fluid containing the claimed brine by mixing a polyacrylamide copolymer with the brine, either before using the brine to formulate a drilling fluid, or during operation as an additive to the drilling fluid. If the polyacrylamide copolymer is used as an additive, an amount of copolymer preferably is added in increments of about 0.25 lb/bbl in order to achieve a surplus of polyacrylamide polymer in the filtrate of about 0.3 to about 1.0 lb/bbl.

The invention will be more clearly understood with reference to the following examples, which are illustrative only and should not be construed as limiting the present invention. In the following Examples, the following materials are trademarked products available from Baker Hughes INTEQ: XAN-PLEX™ D; DICAP™; MIL-BAR™; MIL-CARB™; BIO-PAQ™; and BIOLOSE™. REV-DUST™ is a trademark for a product which may be obtained from Mil-White Company, Houston, Tex. "Encapsulator D" is a commercially available shale inhibitor used for comparative purposes.

BACKGROUND

Early laboratory investigations centered around the evaluation of primary viscosifiers for the proposed fluid. Further laboratory testing included an evaluation of XAN-VIS (clarified xanthan gum with greater calcium tolerance) vs. XAN-PLEX™ D polymer. Shale inhibition tests used shale wafers constructed from GOM "gumbo" and a pelletized bentonite product, "Hole Plug". Additional testing included an examination of the addition of cement treatment additives to prevent the detrimental effects of increased pH on the solubility or cross-linking of biopolymers.

EQUIPMENT

The following laboratory equipment was used in conducting the experiments described in the examples:
Mixer: Prince-Castle equipped with FANN B-7210 Blade or equivalent (3.0 mm (0.5±mm pitch)
Baffled, 2 liter, stainless conical mixing cups (Prototypes) from INTEQ-Houston Fluids
Mixer: Waring Blender with standard blade and mixing cup
Tachometer: hand held Model CT800 described in the RS Components Catalog or equivalent
Mixing Cup: 1 or 2 liter, conical cups, OFI Model 110-50 or equivalent
Balance: precision of 0.01 g (2000 g capacity)
Thermometer: precision of ±1° F. or ±0.5° C.
Thermometer-metal 1¾" dial, 8" stem Cole Palmer H08080-04 precision ±1% of dial range
Motor-Driven Direct Indicating Viscometer as referenced in API RP 13-B-1, $1^{st}$ Edition, June 1990, Par. 2.4
Filter Press as referenced in API RP 13B-1, $1^{st}$ Edition, June 1990, section 3.2
Filter Press as referenced in API RP 13B-1, $1^{st}$ Edition, June 1990, section 3.4
Aging Cells as referenced in API Recommended Practice 13-I, $5^{th}$ Edition, Jun. 1, 1995, section 19
Oven: regulated to desired temperature ±5° F. (±3° C.). Preferred ovens are digitally controlled with 1) dynamic air circulation, 2) temperature recorders and 3) data acquisition system
Glass jars for aging at temperatures <160° F. (450 ml capacity)

The following mixing procedures were used in the following examples:

MIXING PROCEDURES

1. Mixer: Prince-Castle with FANN B7210 or equivalent blade
2. Mixing volume: 2 laboratory barrels (700 mls)
3. Total mixing time: 1 hour
4. Mixing speed: 9000 rpm
5. Mixing Temperature: Ambient to 150° F.
6. Order of addition: An important element of all laboratory testing included a product order of addition and mixing times required for complete product dispersion and/or solubility. The following describes the order of addition, and the mixing time for each product used in testing the formulations:

Component/Time, min/Product
  Water/0 min/liquid phase
  Viscosifier/10 min/XAN-PLEX D
  Fluid Loss Control/10 min/BIO-LOSE™
  11.6 lb/gal $CaCl_2$ brine/1 min/liquid phase
  Shale Stabilizer/30 min/DFE-241/242, Encapsulator D
  Bridging material/5min/MIL-CARB
  Contaminant/4 min/Rev Dust, cement
Notes
  XAN-PLEX™ D was selected as the most cost effective viscosifier. Both Kelco XCD and XAN-PLEX™ D were used in all other tests.
  Baffled mixing cups will reduce spillage and increase shear.

If mixing time for total product additions is less than the total mixing time, continue mixing fluid after the last product addition until the total mixing time has been reached.

After heat aging, mix fluid at 6000 rpm for 5 minutes prior to testing.

Use defoamer as necessary.

Inhibition tests included both the Hole-Plug and "gumbo wafer" tests.

EXAMPLE I

Throughout the first series of tests (Examples I–VIII), emphasis was placed on the performance of a 9.6–9.8 lb/gal $CaCl_2$ fluid; however, a limited number of tests were performed with a 12 lb/gal fluid to establish some continuity effect of the various additives. The calcium chloride content was maintained at 17 wt %. No change in recommended mixing procedures nor treatments were determined for the heavier fluid.

Quantitative data was difficult to obtain using laboratory screening tests. Some trends of screening efficiency could be seen. Three approaches were taken to quantify screening times. In each test, the time (in seconds) required for the majority of a fluid to pass through a screen or sieve under given conditions was measured. The cut-off time was based on visual retention on screen.

In the first test, 350 $cm^3$ of fluid was poured over an 8" sieve while hand held over a vibrator. In another test, a small 3" sonic sifter was briefly evaluated. In a third test, a mechanical shaker was constructed and used in making the measurements.

Effect of shear history and order of addition were considered in the screening series. Lower Prince Castle speeds, pre-dispersed xanthan gum and other shear devices including a Hamilton Beach Blender was part of the overall evaluation process.

Based on the results of these initial screening tests, a number of candidate fluids were selected for full scale screening.

EXAMPLE II

A full scale screen test was performed to evaluate the results of the laboratory study. This test was conducted on a Brandt Shale Shaker. Tests were made using 150 barrels of 9.7 lb/gal calcium chloride fluid as sheared by liquid mixing equipment and after high shear through a Gauthier Polygator device. The Gauthier Polygator device was found to do a superior job in the blending of fluid components, particularly when using the biopolymers. Screen sizes tested were 50's and 24's at an ambient temperature of 65–70° F., and flow rates of 250 gal/min, the maximum capacity that the return line could handle. The tested fluids did not exhibit screen blinding.

The results of all laboratory testing led to the development of a standard test fluid for an initial series of testing and screening of products. This formulation is described in the following Table:

| Composition | Concentration |
|---|---|
| Tap Water, bbl | 0.94 |
| XAN-PLEX ™ D, lb/bbl | 1 |
| DFE-241*, lb/bbl | 1 |
| $CaCl_2$ | 66 |
| BIO-PAQ ™, lb/bbl | 3 |
| MIL-CARB ™, lb/bbl | 10 |

| Properties | Initial | Aged |
|---|---|---|
| Density, lb/gal | 9.6 | 9.6 |
| PV, cP | 15 | 14 |
| YP, lb/100 $ft^2$ | 21 | 18 |
| 10" Gel, lb/100 $ft^2$ | 4 | 3 |
| 10" Gel/lb/100 $ft^2$ | 6 | 4 |
| API, cc/30 min | 4 | 3.2 |
| HTHP**, cc/30 min | | 10.2 |

*DFE-241 was a precursor to DICAP ™ with a similar composition but a higher molecular weight (about one to about 6,000,000 mole weight).
**16 hours at 200° F.

EXAMPLE III

Further tests were conducted using a fluid having the foregoing composition. Testing concerned with the effects of static and hot roll aging on shale wafers and Hole Plug bentonite pellets. For these tests, an encapsulator was added at a 1 lb/bbl concentration to the base fluid. The results of these tests are outlined in the following Table. There was only a small change in the hardness of the shale wafer with 100% recovery. In the case of the Hole Plug, there was an 89.3% recovery after aging.

| Measurement | Static Shale Wafer | Dynamic Hole Plug |
|---|---|---|
| Temperature Aged, ° F. | 100 | 100 |
| Hours Aged | 40 | 40 |
| Initial Hardness | 93 | — |
| Final Hardness | 66 | — |
| Hardness Chg., % | 29 | — |
| Recovery, % | 100 | 89.3 |
| Hydration, % | 13.1 | — |

EXAMPLE IV

Tests continued using a similar 17% $CaCl_2$ base mud with other encapsulating additives to determine the product yielding the most benefit from the standpoint of shale inhibition and screening times. The following results were seen:

| Composition | Base | DFE-241 | DFE-242 |
|---|---|---|---|
| Tapwater, bbl | 0.63 | 0.63 | 0.63 |
| XAN-PLEX ™ D, ppb | 0.9 | 0.9 | 0.9 |
| BIO-PAQ ™, ppb | 3 | 3 | 3 |
| 11.6 ppg, $CaCl_2$, bbl | 0.37 | 0.37 | 0.37 |
| DFE-241, ppb | | 1 | |
| DFE-242, ppb | | | 1 |
| MIL-CARB ™, ppb | 10 | 10 | 10 |
| Properties[1] | | | |
| Fann 600 rpm | 29 | 43 | 42 |
| Fann 300 rpm | 20 | 30 | 30 |
| Fann 200 rpm | 16 | 24 | 24 |
| Fann 100 rpm | 16 | 17 | 17 |
| Fann 6 rpm | 4 | 5 | 6 |
| Fann 3 rpm | 3 | 4 | 4 |
| PV, cP | 9 | 13 | 12 |

-continued

| Composition | Base | DFE-241 | DFE-242 |
|---|---|---|---|
| YP, lb/100 ft² | 11 | 17 | 18 |
| 10" Gel, lb/100 ft² | 3 | 5 | 6 |
| 10' Gel, lb/100 ft² | 4 | 6 | 7 |
| Hole Plug Data² | | | |
| Retained % | 78 | 96 | 95 |
| Shale Water Data³ | | | |
| Initial Hardness | 97 | 97 | 97 |
| Final Hardness | 49 | 67 | 75 |
| Hardness, Chg % | 49 | 31 | 23 |
| Hydration, % | 25 | 20 | 19 |
| Vol Change, % | 55 | 34 | 32 |

[1]Properties taken after hot rolling @ 100° F. for 16 hours
[2]After hot rolling @ 110–120° F. for 40 hours
[3]After static aging @ 110–120° F. for 40 hours The encapsulating polymers provided good recovery, hardness and volume change in the test specimens with DICAP™ providing the best results for the shale wafer tests in hardness change.

EXAMPLE V

A test series was performed to study the effects of shear (high vs. low) and mixing time after the addition of the various components and the ability to screen these muds through a fine mesh shaker screen. The systems were mixed using two different mixing devices; a Prince Castle mixer with controllable rpm to represent the results obtained from low shear mixing, and a Waring Blender for high shear mixing. The following Table tabulates the results of these tests.

| | Mixing Time, min. | | | |
|---|---|---|---|---|
| | High Shear[1] | | Low Shear[2] | |
| Composition | #1 | #2 | #3 | #4 |
| Tapwater, 0.63 bbl | 0 | 0 | 0 | 0 |
| XAN-PLEX ™ D, 0.9 lb/bbl | 5 | 5 | 5 | 5 |
| BIO-PAQ ™, 3.0 lb/bbl | 5 | 10 | 10 | 10 |
| 11.6 ppg CaCl₂, 0.37 bbl | 5 | 5 | 5 | 5 |
| DFE-241, 1.0 LB/BBL | 20 | 30 | 60 | 90 |
| MIL-CARB ™, 10.0 lb/bbl | 5 | 10 | 10 | 10 |
| Properties before REV DUST ™ | | | | |
| Density, lb/gal | 9.7 | 9.7 | 9.7 | 9.7 |
| Fann 600 rpm | 42 | 49 | 47 | 46 |
| Fann 300 rpm | 29 | 34 | 33 | 33 |
| Fann 200 rpm | 23 | 28 | 27 | 27 |
| Fann 100 rpm | 15 | 20 | 19 | 19 |
| Fann 6 rpm | 5 | 6 | 5 | 6 |
| Fann 3 rpm | 4 | 4 | 4 | 4 |
| AV, cP | 21 | 24.5 | 23.5 | 23 |
| PV, cP | 13 | 15 | 14 | 13 |
| YP, lb/100 ft² | 16 | 19 | 19 | 20 |
| 10" Gel, lb/100 ft² | 6 | 6 | 6 | 6 |
| 10' Gel, lb/100 ft² | 6 | 7 | 7 | 7 |
| Properties after 10 ppb REV DUST ™ | | | | |
| Fann 600 rpm | 50 | 59 | 56 | 55 |
| Fann 300 rpm | 34 | 41 | 39 | 38 |
| Fann 200 rpm | 28 | 34 | 32 | 31 |
| Fann 100 rpm | 20 | 25 | 23 | 22 |
| Fann 6 rpm | 6 | 8 | 7 | 7 |
| Fann 3 rpm | 4 | 6 | 5 | 5 |
| AV, cP | 25 | 29.5 | 28 | 27.5 |
| PV, cP | 16 | 17 | 17 | 17 |
| YP, lb/100 ft² | 18 | 24 | 28 | 21 |

-continued

| | Mixing Time, min. | | | |
|---|---|---|---|---|
| | High Shear[1] | | Low Shear[2] | |
| Composition | #1 | #2 | #3 | #4 |
| 10" Gel, lb/100 ft² | 5 | 7 | 6 | 6 |
| 10' Gel, lb/100 ft² | 6 | 8 | 7 | 7 |
| Add 20 ppb Hole Plug, mix 10 min. @ 1000 rpm and screen | | | | |
| Screen Time³, sec/350 cm³ | 115 | 26 | 85 | 24 |

[1]high shear condition: Hamilton Beach mixer @ 60 volts
[2]low shear condition: Prince-Castle mixer @ 3500 rpm
[3]45 mesh screen on Chesser Thresher @ 50 volts The high shear in the first case considerably extended the amount of time required to screen the sample. This could be attributed to the incorporation of air into the sample, giving it a "fluffy" texture, or the additional mixing time on the polymer fluid loss control product or the encapsulator. In the case of the low shear mixing tests, mixing time is a significant factor in the ability to screen the sample.

EXAMPLE VI

Following further laboratory tests and the full scale liquid mud plant investigation, the opportunity for an on site test at an offshore drilling location presented itself. A major operator had previously drilled three prior offset wells in deep-water offshore Gulf of Mexico ("GOM"). Two of the three wells employed a CaCl₂ fluid and the third drilled with a NaCl/PHPA fluid. In the three wells, it required an average of 1-½ additional drilling days because of severe screen blinding. Blinded screens had to be constantly changed which required an interruption of the drilling operation. Associated mud solids build-up contributed to this problem.

The available rig mixing equipment was not satisfactory for proper dispersion of polymer products mixed on location. Polymer "fish eyes" were observed being discarded as well as contributing to the "blinding" of the shaker screens. This further points to the need for better rig mixing equipment and/or product enriched, properly blended muds for volume building being mixed onshore and transported to the rig site. The correct land based mixing equipment does not preclude the need for similar rig equipment, as it is not always practical to mix all systems at a shore based operation.

A deepwater CaCl₂ system was developed and field tested in the GOM. The CaCl₂/DICAP™ system proved successful in controlling the gumbo without severe screen blinding. Instantaneous drill rates up to 200 ft/hr were experienced during the drilling of the gumbo section Drilling days and cost per foot for this section were substantially reduced. Estimated savings was four drilling days, or approximately $800,000 in rig costs.

In summary, the enhanced encapsulation of the CaCl₂/DICAP™ mud system increased ROP, improved solids removal efficiency, and reduced overall interval drilling cost through the gumbo section.

EXAMPLE VII

Additional laboratory work was performed to determine the best formulation for a calcium chloride only base poly acrylamide copolymer to be used in the drilling fluid. The polyacrylamide copolymer used in the foregoing experiments was DFE 241, a relatively high molecular weight version of DICAP™ (with about 6,000,000 mole weight). Laboratory testing found that a lower mole weight version polyacrylamide copolymer, with about 4,000,000 mole weight, was more effective.

EXAMPLE VIII

Numerous laboratory tests were conducted to evaluate the benefits of an encapsulator-in $CaCl_2$ fluids. Results were compared using an untreated $CaCl_2$ base fluid against one treated with DICAP™ and another with Encapsulator D. No pH adjustments were made in this test series. This data is reported in the following Table. It will be noted that DICAP™ gave a significantly greater percentage of sample recovery after aging the samples dynamically for 40 hours at 100° F. and 150° F. aging temperatures.

| Composition | Base Fluid | DICAP Fluid | Encapsulator D Fluid |
|---|---|---|---|
| $CaCl_2$, wt. % | 20 | 20 | 20 |
| XAN-PLEX ™ D, lb/bbl | 0.9 | 0.9 | 0.9 |
| BIO-PAQ ™, lb/bbl | 3.0 | 3.0 | 3.0 |
| DICAP ™, lb/bbl | — | 1.0 | — |
| Encapsulator D, lb/bbl | | | 1.0 |
| MIL-CARB ™, lb/bbl | 10 | 10 | 10 |
| Properties | | | |
| Density, lb/gal | 10.2 | 10.2 | 10.2 |
| AV, cP | 20 | 31 | 24.5 |
| PV, cP | 13 | 21 | 15 |
| YP, lb/100 ft² | 14 | 20 | 19 |
| Results after dynamically aging 40 hours @ 100 F | | | |
| Hole Plug retained, % | 83.5 | 99.0 | 87.1 |
| Results after dynamically aging 40 hours @ 150 F | | | |
| Hole Plug retained, % | 74.8 | 90.2 | 84.8 |

In these and other tests using Hole Plug bentonite pellets, varying degrees of solids recovery were noted following aging in different brine/polymer mixtures. The sample aged in 20% CaCl2 containing one (1) pound per barrel DICAP™ exhibited the least deterioration of any other salt/polymer combination.

EXAMPLE IX

Additional studies were done using a mixture of sodium chloride and calcium chloride. The calcium chloride content was varied from 14 to 17 wt %. The following basic formulation was used in the tests:

| | |
|---|---|
| XAN-PLEX D | 0.5–1.25 lb/bbl |
| BIO-LOSE | 1–3 lb/bbl |
| Brine Water | <18 wt % $CaCl_2$ |
| NaCl | 0–70 lb/bbl |
| DFE-243 | 0.5–1.5 lb/bbl |
| DFE-520/DFE521* | 0–4 lb/bbl |
| MIL-CARB | 10 lb/bbl |
| $NF_2/NF_3$ | As needed for gas hydrates |

*DFE-243, DFE-520 and 521 are internal designations under which the these materials may be purchased from Baker Hughes INTEQ.

The above formulation was tested at varying densities. The results of the tests are listed in the following Table:

| | 10 ppg | | 13 ppg | | 15 ppg | |
|---|---|---|---|---|---|---|
| Water, bbl | 0.75 | 0.75 | 0.67 | 0.67 | 0.62 | 0.62 |
| Xan Plex D, lb/bbl | 1 | 1 | 0.9 | 0.9 | 0.82 | 0.82 |
| Bio Lose, lb/bbl | 3 | 3 | 2.7 | 2.7 | 2.5 | 2.5 |
| NaCl, lb/bbl | 60 | 60 | 54 | 54 | 49 | 49 |
| 11.6 ppg $CaCl_2$, lb/bbl | 0.17 | 0.17 | 0.15 | 0.15 | 0.14 | 0.14 |
| DFE-243, lb/bbl | 1 | 1 | 0.9 | 0.9 | 0.82 | 0.82 |
| DFE-521, lb/bbl | 2 | 2 | 2.2 | 2.8 | 2.5 | 3.5 |
| Mil Carb, lb/bbl | 10 | 10 | 9 | 9 | 8.2 | 8.2 |
| Mil Bar, lb/bbl | / | / | 160 | 160 | 273 | 273 |
| MgO, lb/bbl | 0.5 | 0.5 | 0.45 | 0.45 | 0.41 | 0.41 |
| NF3, bbl | / | / | / | / | 0.04 | 0.06 |
| Solids*, % | 4 | 6 | 4 | 6 | 4 | 6 |
| Properties after aging | | | | | | |
| HR@ 150° F. | 16 hrs | 16 hrs | 16 hrs | 16 hrs | 16 hrs | 16 hrs |
| Static aging @ 200° F. | / | 16 hrs | / | 16 hrs | / | 16 hrs |
| Shearing after aging? | No | Yes | No | Yes | No | Yes |
| PV @ 120° F. | 11 | 11 | 22 | 19 | 33 | 44 |
| YP | 15 | 14 | 21 | 20 | 33 | 30 |
| 10" Gel | 3 | 4 | 5 | 5 | 6 | 6 |
| 10' Gel | 5 | 6 | 6 | 7 | 8 | 9 |
| Density, ppg | 10.5 | 10.7 | 13.2 | 13.2 | 15 | 15 |
| API Filtrate, ml | 4.7 | 9 | 9.5 | 9 | 9.8 | 5.1 |
| HTHP @ 200 F, ml | 14 | 21.2 | 17 | 23 | 20.6 | 35 |

Solids: 1:1 blended Rev Dust + ground Vol clay

The addition of a mixture of salts including sodium chloride aided in gas hydrate suppression as well as density control. The polyacrylamide DFE-243 has a low molecular weight of from about 800,000 to 1 million mole weight and has about a 5% cationic charge, which improved the API and HTHP filtration results and lowered the coagulation of low gravity solids. Colloid stabilizers DFE520/521, available from Baker Hughes INTEQ, were used to offset the degree of coagulation and provide extra filter control.

Many modifications may be made to the present invention without departing from the spirit and scope of the present invention. The embodiment described herein is meant to be illustrative only and should not be taken as limiting the invention, which is defined in the following claims.

We claim:

1. A drilling fluid having effective rheology and fluid loss control properties comprising:

water as a continuous phase;

a first amount of a divalent metal salt; and, a quantity of a polyacrylamide copolymer comprising partially hydrolyzed polyacrylamide and trimethylaminoethyl acrylate, having a cationic charge density of from about 5% to about 10%.

2. The fluid of claim 1, wherein said divalent metal salt is calcium chloride.

3. A drilling fluid comprising:

water as a continuous phase;

a first amount of a divalent metal salt; and, a quantity of a polyacrylamide copolymer having a cationic charge density of from about 5% to about 10% and having the following general structure:

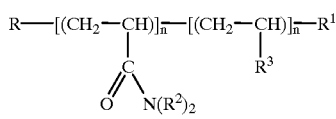

wherein R and R¹ are selected from the group consisting of hydrogen, acrylamide groups, acrylate groups, polyacrylamide groups, and polyacrylate groups, and copolymers thereof;

R² is selected from the group consisting individually of hydrogen and alkyl groups;

R³ is selected from the group consisting of ester groups comprising a cationic group and amide groups comprising at least one cationic group, wherein said cationic group comprises a charge in the range of from about +1 to about +4; and n is at least 1.

4. A drilling fluid comprising
water as a continuous phase;
a first amount of calcium chloride; and,
a quantity of a polyacrylamide copolymer having a cationic charge density of from about 5% to about 10% and the following general structure:

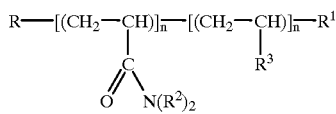

wherein R and R¹ are selected from the group consisting of hydrogen, acrylamide groups, acrylate groups, polyacrylamide groups, and polyacrylate groups, and copolymers thereof;

R² is selected from the group consisting individually of hydrogen and alkyl groups;

R³ is selected from the group consisting of ester groups comprising a cationic group and amide groups comprising at least one cationic group, wherein said cationic group comprises a charge in the range of from about +1 to about +4; and n is at least 1.

5. The fluid of claim 1, further comprising a second amount of a monovalent salt, said second amount being sufficient to increase gas hydrate suppression and decrease density when compared to said fluid consisting essentially of only said divalent salt in the absence of said monovalent salt.

6. The fluid of claim 5, wherein said divalent salt is calcium chloride and said monovalent salt is sodium chloride.

7. The fluid of claim 6, wherein said calcium choride is from about 5 wt % to about 20 wt %, and said sodium chloride is about 40 lb/bbl to about 70 lb/bbl.

8. The fluid of claim 1 wherein said polyacrylamide copolymer has a molecular weight of from about 800,000 to about 1 million mole weight.

9. The fluid of claim 2 wherein said polyacrylamide copolymer has a molecular weight of from about 800,000 to about 1 million mole weight.

10. The fluid of claim 3 wherein said polyacrylamide copolymer has a molecular weight of from about 800,000 to about 1 million mole weight.

11. The fluid of claim 4 wherein said polyacrylamide copolymer has a molecular weight of from about 800,000 to about 1 million mole weight.

12. The drilling fluid of claim 3 wherein at least one of said cationic groups has the following general structure:

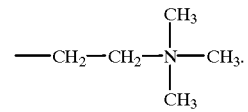

13. A method for increasing the rate of penetration of a drill bit using an aqueous drilling fluid having effective rheology and fluid loss control properties, said method comprising:

providing an aqueous drilling fluid comprising a combination of a salt of a divalent metal, a salt of a monovalent metal, and a quantity of a polyacrylamide copolymer having a cationic charge density of from about 5% to about 10%;

wherein said polyacrylamide copolymer has the following general structure:

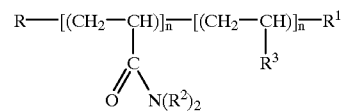

wherein R and R¹ are selected from the group consisting of hydrogen, acrylamide groups, acrylate groups, polyacrylamide groups, and polyacrylate groups, and copolymers thereof;

R² is selected from the group consisting individually of hydrogen, and alkyl groups;

R³ is selected from the group consisting of ester groups comprising a cationic group and amide groups comprising at least one cationic group, wherein said cationic group comprises a charge in the range of from about +1 to about +4; and n is at least 1.

14. A method for increasing the rate of penetration of a drill bit using an aqueous drilling fluid having effective rheology and fluid loss control properties, said method comprising providing an aqueous drilling fluid comprising a combination of a salt of a divalent metal, a salt of a monovalent metal, and a quantity of a polyacrylamide copolymer comprising partially hydrolyzed polyacrylamide and trimethylaminoethyl acrylate having a cationic charge density of from about 5% to about 10%.

15. The method of claim 14, wherein said salt of said divalent metal is calcium chloride and said salt of said monovalent metal is sodium chloride.

16. The method of claim 15, wherein said calcium choride is from about 5 wt % to about 20 wt %, and said sodium chloride is about 40 lb/bbl to about 70 lb/bbl.

17. The method of claim 15 wherein said polyacrylamide copolymer has a molecular weight of from about 800,000 to about 1 million mole weight.

18. A drilling fluid having effective rheology and fluid loss control properties, said drilling fluid comprising:

water as a continuous phase;
from about 5 to about 20 wt % calcium chloride;
from about 0 to about 70 lb/bbl sodium chloride; and
a polyacrylamide copolymer comprising partially hydrolyzed polyacrylamide and trimethylaminoethyl acrylate having a mole weight of from about 500,000 to about 4 million and having a cationic charge density of from about 1 to about 15 mol. %.

19. The drilling fluid of claim 1 wherein said fluid comprises from about 0.05 weight % to about 0.5 wt. % of said polyacrylamide copolymer.

20. The drilling fluid of claim 18 wherein said fluid comprises from about 0.05 weight % to about 0.5 wt. % of said polyacrylamide copolymer.

21. The fluid of claim 2, further comprising a second amount of a monovalent salt, said second amount being sufficient to increase gas hydrate suppression and decrease density when compared to said fluid consisting essentially of only said divalent salt in the absence of said monovalent salt.

22. The fluid of claim 21, wherein said divalent salt is calcium chloride and said monovalent salt is sodium chloride.

23. The fluid of claim 22, wherein said calcium chloride is from about 5 wt. % to about 20 wt. %, and said sodium chloride is about 40 lb./bb.

24. The fluid of claim 3, further comprising a second amount of a monovalent salt, said second amount being sufficient to increase gas hydrate suppression and decrease density when compared to said fluid consisting essentially of only said divalent salt in the absence of said monovalent salt.

25. The fluid of claim 24, wherein said divalent salt is calcium chloride and said monovalent salt is sodium chloride.

26. The fluid of claim 25, wherein said calcium choride is from about 5 wt % to about 20 wt %, and said sodium chloride is about 40 lb/bb.

27. The fluid of claim 4, further comprising a second amount of a monovalent salt, said second amount being sufficient to increase gas hydrate suppression and decrease density when compared to said fluid consisting essentially of only said divalent salt in the absence of said monovalent salt.

28. The fluid of claim 27, wherein said divalent salt is calcium chloride and said monovalent salt is sodium chloride.

29. The fluid of claim 28, wherein said calcium chloride is from about 5 wt. % to about 20 wt. %, and said sodium chloride is about 40 lb./bb.

30. The fluid of claim 8, further comprising a second amount of a monovalent salt, said second amount being sufficient to increase gas hydrate suppression and decrease density when compared to said fluid consisting essentially of only said divalent salt in the absence of said monovalent salt.

31. The fluid of claim 30, wherein said divalent salt is calcium chloride and said monovalent salt is sodium chloride.

32. The fluid of claim 31, wherein said calcium choride is from about 5 wt % to about 20 wt %, and said sodium chloride is about 40 lb/bb.

33. The fluid of claim 10, further comprising a second amount of a monovalent salt, said second amount being sufficient to increase gas hydrate suppression and decrease density when compared to said fluid consisting essentially of only said divalent salt in the absence of said monovalent salt.

34. The fluid of claim 33, wherein said divalent salt is calcium chloride and said monovalent salt is sodium chloride.

35. The fluid of claim 34, wherein said calcium chloride is from about 5 wt. % to about 20 wt. %, and said sodium chloride is about 40 lb./bb.

36. The fluid of claim 12, further comprising a second amount of a monovalent salt, said second amount being sufficient to increase gas hydrate suppression and decrease density when compared to said fluid consisting essentially of only said divalent salt in the absence of said monovalent salt.

37. The fluid of claim 36, wherein said divalent salt is calcium chloride and said monovalent salt is sodium chloride.

38. The fluid of claim 37, wherein said calcium choride is from about 5 wt % to about 20 wt %, and said sodium chloride is about 40 lb/bb.

39. The fluid of claim 5 wherein said polyacrylamide copolymer has a molecular weight of from about 800,000 to about 1 million mole weight.

40. The fluid of claim 6 wherein said polyacrylamide copolymer has a molecular weight of from about 800,000 to about 1 million mole weight.

41. The fluid of claim 7 wherein said polyacrylamide copolymer has a molecular weight of from about 800,000 to about 1 million mole weight.

42. The fluid of claim 12 wherein said polyacrylamide copolymer has a molecular weight of from about 800,000 to about 1 million mole weight.

43. The fluid of claim 18 wherein said polyacrylamide copolymer has a molecular weight of from about 800,000 to about 1 million mole weight.

44. The fluid of claim 19 wherein said polyacrylamide copolymer has a molecular weight of from about 800,000 to about 1 million mole weight.

45. The fluid of claim 20 wherein said polyacrylamide copolymer has a molecular weight of from about 800,000 to about 1 million mole weight.

46. A method for increasing the rate of penetration of a drill bit using an aqueous drilling fluid having effective rheology and fluid loss control properties, said method comprising providing an aqueous drilling fluid comprising a combination comprising a salt of a divalent metal and a quantity of a polyacrylamide copolymer comprising partially hydrolyzed polyacrylamide and trimethylaminoethyl acrylate having a cationic charge density of from about 5% to about 10%.

47. The method of claim 46 wherein said polyacrylamide copolymer has a molecular weight of from about 800,000 to about 1 million mole weight.

48. A method for increasing the rate of penetration of a drill bit using an aqueous drilling fluid having effective rheology and fluid loss control properties, said method comprising:
providing an aqueous drilling fluid comprising a combination of a salt of a divalent metal, a salt of a monovalent metal, and a quantity of a polyacrylamide copolymer having a cationic charge density of from about 5% to about 10%;
wherein said polyacrylamide copolymer has the following general structure:

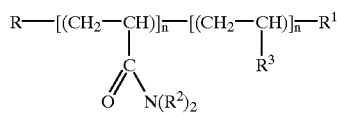

wherein R and R$^1$ are selected from the group consisting of hydrogen, acrylamide groups, acrylate groups, polyacrylamide groups, and polyacrylate groups, and copolymers thereof;
R$^2$ is selected from the group consisting individually of hydrogen and alkyl groups;
R$^3$ is selected from the group consisting of ester groups comprising a cationic group and amide groups comprising at least one cationic group, wherein said cationic group comprises a charge in the range of from about +1 to about +4; and
n is at least 1.

49. The method of claim 48 wherein at least one of said cationic groups has the following general structure:

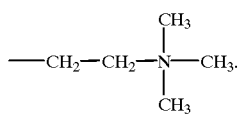

50. The method of claim 49 wherein said polyacrylamide copolymer has a molecular weight of from about 800,000 to about 1 million mole weight.

51. A method for increasing the rate of penetration of a drill bit using an aqueous drilling fluid having effective rheology and fluid loss control properties, said method comprising:

providing an aqueous drilling fluid comprising a combination of a salt of a divalent metal, a salt of a monovalent metal, and a quantity of a polyacrylamide copolymer having a molecular weight of from about 800,000 to about 1 million mole weight and having a cationic charge density of from about 5% to about 10%;

wherein said polyacrylamide copolymer has the following general structure:

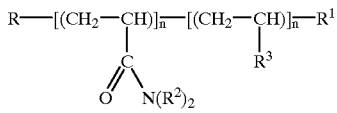

wherein R and $R^1$ are selected from the group consisting of hydrogen, acrylamide groups, acrylate groups, polyacrylamide groups, and polyacrylate groups, and copolymers thereof;

$R^2$ is selected from the group consisting individually of hydrogen and alkyl groups;

$R^3$ is selected from the group consisting of ester groups comprising a cationic group and amide groups comprising at least one cationic group, wherein said cationic group comprises a charge in the range of from about +1 to about +4; and n is at least 1.

52. The method of claim 49 wherein said polyacrylamide copolymer has the following general structure:

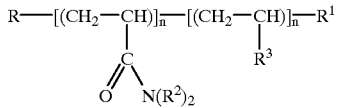

wherein R and $R^1$ are selected from the group consisting of hydrogen, acrylamide groups, acrylate groups, polyacrylamide groups, and polyacrylate groups, and copolymers thereof;

$R^2$ is selected from the group consisting individually of hydrogen and alkyl groups;

$R^3$ is selected from the group consisting of ester groups comprising a cationic group and amide groups comprising at least one cationic group, wherein said cationic group comprises a charge in the range of from about +1 to about +4; and n is at least 1.

53. A method for increasing the rate of penetration of a drill bit using an aqueous drilling fluid having effective rheology and fluid loss control properties, said method comprising:

providing an aqueous drilling fluid comprising a combination comprising a salt of a divalent metal and a quantity of a polyacrylamide copolymer having a cationic charge density of from about 5% to about 10%;

wherein said polyacrylamide copolymer has the following general structure:

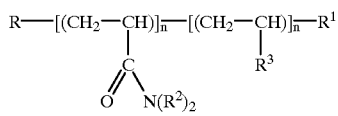

wherein R and $R^1$ are selected from the group consisting of hydrogen, acrylamide groups, acrylate groups, polyacrylamide groups, and polyacrylate groups, and copolymers thereof;

$R^2$ is selected from the group consisting individually of hydrogen and alkyl groups;

$R^3$ is selected from the group consisting of ester groups comprising a cationic group and amide groups comprising at least one cationic group, wherein said cationic group comprises a charge in the range of from about +1 to about +4; and n is at least 1.

54. The method of claim 53 wherein at least one of said cationic groups has the following general structure:

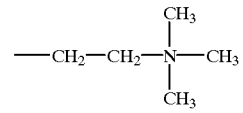

55. A method for increasing the rate of penetration of a drill bit using an aqueous drilling fluid having effective rheology and fluid loss control properties, said method comprising:

providing an aqueous drilling fluid comprising a combination comprising a salt of a divalent metal and a quantity of a polyacrylamide copolymer having a cationic charge density of from about 5% to about 10% and a molecular weight of from about 800,000 to about 1 million mole weight;

wherein said polyacrylamide copolymer has the following general structure:

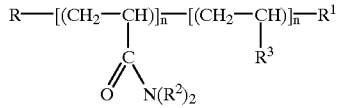

wherein R and $R^1$ are selected from the group consisting of hydrogen, acrylamide groups, acrylate groups, polyacrylamide groups, and polyacrylate groups, and copolymers thereof;

$R^2$ is selected from the group consisting individually of hydrogen and alkyl groups;

$R^3$ is selected from the group consisting of ester groups comprising a cationic group and amide groups comprising at least one cationic group, wherein said cationic group comprises a charge in the range of from about +1 to about +4; and n is at least 1.

56. The method of claim 55 wherein at least one of said cationic groups has the following general structure:

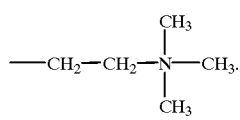

57. The method of claim 17 wherein said salt of said divalent metal is calcium chloride and said salt of said monovalent metal is sodium chloride.

58. The method of claim 57 wherein said calcium chloride is from about 5 wt. % to about 20 wt. % and said sodium chloride is about 40 lb./bbl. to about 70 lb./bbl.

59. The drilling fluid of claim 2 wherein said fluid comprises from about 0.05 wt. % to about 0.5 wt. % of said polyacrylamide copolymer.

60. The drilling fluid of claim 3 wherein said fluid comprises from about 0.05 wt. % to about 0.5 wt. % of said polyacrylamide copolymer.

61. The drilling fluid of claim 4 wherein said fluid comprises from about 0.05 wt. % to about 0.5 wt. % of said polyacrylamide copolymer.

62. The drilling fluid of claim 5 wherein said fluid comprises from about 0.05 wt. % to about 0.5 wt. % of said polyacrylamide copolymer.

63. The drilling fluid of claim 6 wherein said fluid comprises from about 0.05 wt. % to about 0.5 wt. % of said polyacrylamide copolymer.

64. The drilling fluid of claim 7 wherein said fluid comprises from about 0.05 wt. % to about 0.5 wt. % of said polyacrylamide copolymer.

65. A drilling fluid having effective rheology and fluid loss control properties comprising:
water as a continuous phase;
from about 5 wt. % to about 20 wt. % of a divalent metal salt; and,
from about 0.05 wt. % to about 0.5 wt. % of a polyacrylamide copolymer comprising partially hydrolyzed polyacrylamide and trimethylaminoethyl acrylate, having a cationic charge density of from about 5% to about 10%.

66. The fluid of claim 65 wherein said divalent metal salt is calcium chloride.

67. A drilling fluid having effective rheology and fluid loss control properties comprising:
water as a continuous phase;
from about 5 wt. % to about 20 wt. % of a divalent metal salt; and,
from about 0.05 wt. % to about 0.5 wt. % of a polyacrylamide copolymer having a cationic charge density of from about 5% to about 10% and having the following general structure:

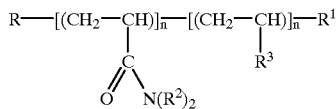

wherein R and R¹ are selected from the group consisting of hydrogen, acrylamide groups, acrylate groups, polyacrylamide groups, and polyacrylate groups, and copolymers thereof;
R² is selected from the group consisting individually of hydrogen and alkyl groups;
R³ is selected from the group consisting of ester groups comprising a cationic group and amide groups comprising at least one cationic group, wherein said cationic group comprises a charge in the range of from about +1 to about +4; and
n is at least 1.

68. A drilling fluid having effective rheology and fluid loss control properties comprising:
water as a continuous phase;
from about 5 wt. % to about 20 wt. % of a divalent metal salt comprising calcium chloride; and,
from about 0.05 wt. % to about 0.5 wt. % of a polyacrylamide copolymer having a cationic charge density of from about 5% to about 10% and having the following general structure:

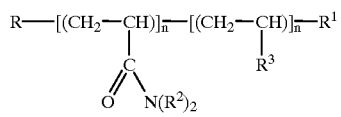

wherein R and R¹ are selected from the group consisting of hydrogen, acrylamide groups, acrylate groups, polyacrylamide groups, and polyacrylate groups, and copolymers thereof;
R² is selected from the group consisting individually of hydrogen and alkyl groups;
R³ is selected from the group consisting of ester groups comprising a cationic group and amide groups comprising at least one cationic group, wherein said cationic group comprises a charge in the range of from about +1 to about +4; and
n is at least 1.

69. The fluid of claim 65, further comprising an amount of a monovalent salt, said amount being sufficient to increase gas hydrate suppression and decrease density when compared to said fluid consisting essentially of only said divalent salt in the absence of said monovalent salt.

70. The fluid of claim 69, wherein said monovalent salt is sodium chloride.

71. The fluid of claim 66, further comprising an amount of a monovalent salt, said amount being sufficient to increase gas hydrate suppression and decrease density when compared to said fluid consisting essentially of only said divalent salt in the absence of said monovalent salt.

72. The fluid of claim 71, wherein said monovalent salt is sodium chloride.

73. The fluid of claim 67, further comprising an amount of a monovalent salt, said second amount being sufficient to increase gas hydrate suppression and decrease density when compared to said fluid consisting essentially of only said divalent salt in the absence of said monovalent salt.

74. The fluid of claim 73, wherein said monovalent salt is sodium chloride.

75. The fluid of claim 70 wherein said sodium chloride is from about 40 lb./bbl. to about 70 lb./bbl.

76. The fluid of claim 72 wherein said sodium chloride is from about 40 lb./bbl. to about 70 lb./bbl.

77. The fluid of claim 74 wherein said sodium chloride is from about 40 lb./bbl. to about 70 lb./bbl.

78. The fluid of claim 65 wherein said polyacrylamide copolymer has a molecular weight of from about 800,000 to about 1 million mole weight.

79. The fluid of claim 66 wherein said polyacrylamide copolymer has a molecular weight of from about 800,000 to about 1 million mole weight.

80. The fluid of claim 67 wherein said polyacrylamide copolymer has a molecular weight of from about 800,000 to about 1 million mole weight.

81. The fluid of claim 68 wherein said polyacrylamide copolymer has a molecular weight of from about 800,000 to about 1 million mole weight.

82. The fluid of claim 69 wherein said polyacrylamide copolymer has a molecular weight of from about 800,000 to about 1 million mole weight.

83. The fluid of claim 70 wherein said polyacrylamide copolymer has a molecular weight of from about 800,000 to about 1 million mole weight.

84. The fluid of claim 71 wherein said polyacrylamide copolymer has a molecular weight of from about 800,000 to about 1 million mole weight.

85. The fluid of claim 72 wherein said polyacrylamide copolymer has a molecular weight of from about 800,000 to about 1 million mole weight.

86. The fluid of claim 73 wherein said polyacrylamide copolymer has a molecular weight of from about 800,000 to about 1 million mole weight.

87. The fluid of claim 74 wherein said polyacrylamide copolymer has a molecular weight of from about 800,000 to about 1 million mole weight.

88. The fluid of claim 75 wherein said polyacrylamide copolymer has a molecular weight of from about 800,000 to about 1 million mole weight.

89. The fluid of claim 76 wherein said polyacrylamide copolymer has a molecular weight of from about 800,000 to about 1 million mole weight.

90. The fluid of claim 77 wherein said polyacrylamide copolymer has a molecular weight of from about 800,000 to about 1 million mole weight.

91. The drilling fluid of claim 8 wherein said fluid comprises from about 0.05 wt. % to about 0.5 wt. % of said polyacrylamide copolymer.

92. The drilling fluid of claim 9 wherein said fluid comprises from about 0.05 wt. % to about 0.5 wt. % of said polyacrylamide copolymer.

93. The drilling fluid of claim 10 wherein said fluid comprises from about 0.05 wt. % to about 0.5 wt. % of said polyacrylamide copolymer.

94. The drilling fluid of claim 11 wherein said fluid comprises from about 0.05 wt. % to about 0.5 wt. % of said polyacrylamide copolymer.

95. The drilling fluid of claim 12 wherein said fluid comprises from about 0.05 wt. % to about 0.5 wt. % of said polyacrylamide copolymer.

96. The method of claim 48 wherein said fluid comprises from about 0.05 wt. % to about 0.5 wt. % of said polyacrylamide copolymer.

97. The method of claim 15 wherein said fluid comprises from about 0.05 wt. % to about 0.5 wt. % of said polyacrylamide copolymer.

98. The method of claim 16 wherein said fluid comprises from about 0.05 wt. % to about 0.5 wt. % of said polyacrylamide copolymer.

99. The method of claim 14 wherein said fluid comprises from about 0.05 wt. % to about 0.5 wt. % of said polyacrylamide copolymer.

100. The method of claim 17 wherein said fluid comprises from about 0.05 wt. % to about 0.5 wt. % of said polyacrylamide copolymer.

101. The method of claim 49 wherein said fluid comprises from about 0.05 wt. % to about 0.5 wt. % of said polyacrylamide copolymer.

102. The method of claim 46 wherein said fluid comprises from about 0.05 wt. % to about 0.5 wt. % of said polyacrylamide copolymer.

103. The method of claim 47 wherein said fluid comprises from about 0.05 wt. % to about 0.5 wt. % of said polyacrylamide copolymer.

104. The method of claim 54 wherein said fluid comprises from about 0.05 wt. % to about 0.5 wt. % of said polyacrylamide copolymer.

105. The method of claim 56 wherein said fluid comprises from about 0.05 wt. % to about 0.5 wt. % of said polyacrylamide copolymer.

106. The method of claim 48 wherein said fluid comprises from about 0.05 wt. % to about 0.5 wt. % of said polyacrylamide copolymer.

107. The method of claim 49 wherein said fluid comprises from about 0.05 wt. % to about 0.5 wt. % of said polyacrylamide copolymer.

108. The method of claim 52 wherein said fluid comprises from about 0.05 wt. % to about 0.5 wt. % of said polyacrylamide copolymer.

109. The method of claim 53 wherein said fluid comprises from about 0.05 wt. % to about 0.5 wt. % of said polyacrylamide copolymer.

110. The method of claim 55 wherein said fluid comprises from about 0.05 wt. % to about 0.5 wt. % of said polyacrylamide copolymer.

111. The drilling fluid of claim 1 wherein said combination is effective, even absent a material selected from the group consisting of oil or a synthetic base lubricant, to produce a rate of penetration approaching that achieved using a synthetic oil-based drilling fluid while preventing substantial screen blinding.

112. The method of claim 13 wherein said combination is effective, even absent a material selected from the group consisting of oil or a synthetic base lubricant, to produce a rate of penetration approaching that achieved using a synthetic oil-based drilling fluid while preventing substantial screen blinding.

113. The method of claim 15 wherein said combination is effective, even absent a material selected from the group consisting of oil or a synthetic base lubricant, to produce a rate of penetration approaching that achieved using a synthetic oil-based drilling fluid while preventing substantial screen blinding.

114. The method of claim 16 wherein said combination is effective, even absent a material selected from the group consisting of oil or a synthetic base lubricant, to produce a rate of penetration approaching that achieved using a synthetic oil-based drilling fluid while preventing substantial screen blinding.

115. The method of claim 14 wherein said combination is effective, even absent a material selected from the group consisting of oil or a synthetic base lubricant, to produce a rate of penetration approaching that achieved using a synthetic oil-based drilling fluid while preventing substantial screen blinding.

116. The method of claim 50 wherein said combination is effective, even absent a material selected from the group consisting of oil or a synthetic base lubricant, to produce a rate of penetration approaching that achieved using a synthetic oil-based drilling fluid while preventing substantial screen blinding.

117. The method of claim 51 wherein said combination is effective, even absent a material selected from the group consisting of oil or a synthetic base lubricant, to produce a rate of penetration approaching that achieved using a synthetic oil-based drilling fluid while preventing substantial screen blinding.

118. The method of claim 52 wherein said combination is effective, even absent a material selected from the group consisting of oil or a synthetic base lubricant, to produce a rate of penetration approaching that achieved using a synthetic oil-based drilling fluid while preventing substantial screen blinding.

119. The method of claim 53 wherein said combination is effective, even absent a material selected from the group consisting of oil or a synthetic base lubricant, to produce a rate of penetration approaching that achieved using a synthetic oil-based drilling fluid while preventing substantial screen blinding.

120. The method of claim 55 wherein said combination is effective, even absent a material selected from the group consisting of oil or a synthetic base lubricant, to produce a rate of penetration approaching that achieved using a synthetic oil-based drilling fluid while preventing substantial screen blinding.

121. The method of claim 51 wherein at least one of said cationic groups has the following general structure:

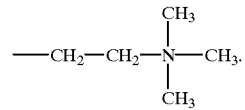

* * * * *